(12) United States Patent
Lee et al.

(10) Patent No.: US 7,747,233 B2
(45) Date of Patent: Jun. 29, 2010

(54) APPARATUS AND METHOD FOR SELECTING AN ANTENNA IN A DIGITAL BROADCAST RECEIVING TERMINAL

(75) Inventors: Kyung-Ha Lee, Seongnam-si (KR); Byung-Duck Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 603 days.

(21) Appl. No.: 11/257,167

(22) Filed: Oct. 24, 2005

(65) Prior Publication Data
US 2006/0094368 A1 May 4, 2006

(30) Foreign Application Priority Data
Oct. 23, 2004 (KR) .................. 10-2004-0085078

(51) Int. Cl.
H04B 17/02 (2006.01)
H04B 17/00 (2006.01)
H04B 1/06 (2006.01)
H04B 7/00 (2006.01)

(52) U.S. Cl. .................. 455/134; 455/226.1; 455/277.2

(58) Field of Classification Search .................. 455/134, 455/135, 161.3, 226.1, 226.2, 226.3, 250.1, 455/277.2
See application file for complete search history.

(56) References Cited

U.S. PATENT DOCUMENTS

| 4,403,343 | A | 9/1983 | Hamada | |
|---|---|---|---|---|
| 6,301,469 | B1 | 10/2001 | Kim | |
| 6,330,433 | B1 * | 12/2001 | Jager | 455/277.2 |
| 6,947,716 | B2 * | 9/2005 | Ono | 455/273 |
| 7,155,267 | B2 * | 12/2006 | Lee | 455/575.7 |
| 7,158,769 | B2 * | 1/2007 | Okanoue et al. | 455/226.1 |
| 2003/0224742 | A1 * | 12/2003 | Sekine et al. | 455/126 |
| 2004/0102193 | A1 * | 5/2004 | Kitami et al. | 455/435.3 |
| 2004/0106389 | A1 * | 6/2004 | Chiou | 455/260 |
| 2005/0064825 | A1 * | 3/2005 | Forrester | 455/101 |
| 2005/0148306 | A1 * | 7/2005 | Hiddink | 455/101 |
| 2005/0186931 | A1 * | 8/2005 | Laiho et al. | 455/280 |
| 2005/0191978 | A1 | 9/2005 | Spencer et al. | |

(Continued)

FOREIGN PATENT DOCUMENTS

CN 1248827 3/2000

(Continued)

*Primary Examiner*—Nay A Maung
*Assistant Examiner*—Andrew Wendell
(74) *Attorney, Agent, or Firm*—The Farrell Law Firm, LLP

(57) ABSTRACT

An apparatus and method for supplying information so that power consumption in a digital broadcast receiving terminal can be reduced and a user can use an appropriate antenna depending on a situation. The digital broadcast receiving terminal includes an external antenna detachably assembled with the outside of the terminal a switch unit for selecting any one among the internal antennas and the external antenna, and a signal-receiving condition sensing unit capable of sensing the signal-receiving condition of the internal antennas and the external antenna. If it is impossible to receive the digital broadcast signal by using the internal antennas, the external antenna is used. If the external antenna is mounted, power is supplied only to an RF unit connected to the external antenna and the power supply to the remaining RF unit is cut off, reducing power consumption.

56 Claims, 7 Drawing Sheets

U.S. PATENT DOCUMENTS

| | | | |
|---|---|---|---|
| 2005/0250543 A1* | 11/2005 | Thermond | 455/562.1 |
| 2006/0146918 A1 | 7/2006 | Black et al. | |
| 2007/0072570 A1* | 3/2007 | Hottinen et al. | 455/277.2 |

FOREIGN PATENT DOCUMENTS

| | | |
|---|---|---|
| CN | 1498460 | 5/2004 |
| CN | 2619438 | 6/2004 |
| GB | 2 342 820 | 4/2000 |
| GB | 2 406 748 | 4/2005 |
| JP | 04-054190 | 2/1992 |
| JP | 05-102879 | 4/1993 |
| JP | 06-112870 | 4/1994 |
| JP | 07-123037 | 5/1995 |
| JP | 10308701 | 11/1998 |
| JP | 11-027190 | 1/1999 |
| JP | 11-284555 | 10/1999 |
| KR | 2000-0011980 | 2/2000 |
| KR | 2002-0022114 | 3/2002 |
| WO | WO 02/03570 | 1/2002 |
| WO | WO 03/067771 | 8/2003 |
| WO | WO 2006/011776 | 2/2006 |

* cited by examiner

APPARATUS AND METHOD FOR SELECTING AN ANTENNA IN A DIGITAL BROADCAST RECEIVING TERMINAL

PRIORITY

This application claims priority to an application entitled "Apparatus and Method for Selecting Antenna in Digital Broadcast Receiving Terminal" filed with the Korean Industrial Property Office on Oct. 23, 2004 and assigned Serial No. 2004-85078, the contents of which are incorporated herein by reference.

BACKGROUND OF THE INVENTION

1. Field of the Invention

The present invention relates to a terminal capable of receiving a digital broadcast signal, and in particular a digital broadcast receiving terminal employing both an internal antenna and an external antenna.

2. Description of the Related Art

The above-mentioned external antenna is highly superior to an antenna employed in a conventional digital broadcast receiving terminal on the basis of signal-receiving sensitivity and signal-to-noise ratio. However, such an external antenna is generally very large in size as compared to an internal antenna. Due to the large size, the external antenna causes it to be very inconvenient to use a digital broadcast receiving terminal. Accordingly, a conventional digital broadcast receiving terminal uses an external antenna only when it is determined that it is impossible to receive a digital broadcast signal using an internal antenna. With an external antenna, the digital broadcast receiving terminal can receive a digital broadcast signal even in the area where it is impossible to receive a digital broadcast signal using the internal antenna. As such, a modern digital broadcast receiving terminal may be operated either in an internal antenna use mode or an external antenna use mode. However, with a conventional broadcast receiving terminal having the external antenna, even if a user moves to an area where it is unnecessary to use an external antenna, there is no way to inform the user that the external antenna is not needed. Therefore, a problem exists with a conventional broadcast receiving terminal in that the user is inconvenienced by having to use an external antenna even if a broadcasting signal can be sufficiently received by an internal antenna.

Furthermore, when an external antenna is used, it is not required to use an internal antenna because the gain of the external antenna is substantially high as compared with that of the internal antenna. This is because the quality of a received signal required by the digital broadcast receiving terminal can be assured without using a Radio Frequency (RF) unit connected to the internal antenna. Therefore, when the external antenna is used, there is no need to supply power to the RF unit connected to the internal antenna. However, with the conventional digital broadcast receiving terminal there is no way to control power to the RF unit and thus power is unnecessarily consumed.

SUMMARY OF THE INVENTION

Accordingly, the present invention has been made to solve the above-mentioned problems occurring in the prior art, and an object of the present invention is to provide an apparatus and method of informing a user of an appropriate antenna use mode in a digital broadcast receiving terminal.

Another object of the present invention is to provide an apparatus and method for minimizing power consumption when an external antenna is used in a digital broadcast receiving terminal employing both internal and external antennas.

In order to achieve the above-mentioned objects, there is an apparatus for selecting an antenna in a digital broadcast receiving terminal having at least one fixedly provided second antenna, including at least one first antenna which is detachably assembled with the outside of the digital broadcast receiving terminal; a signal-receiving condition sensing unit for sensing a signal-receiving condition for a digital broadcast signal input from any one of the first antenna and the second antenna; and a controller informing a user which antenna is more appropriate to receive the digital broadcast signal among the first antenna and the second antenna, depending on the sensing result of the signal-receiving condition sensing unit.

According to another aspect of the present invention, there is also provided a method for selecting an antenna in a digital broadcast receiving terminal including steps of receiving a digital broadcast signal through any one of the first antenna and the second antenna; sensing the signal-receiving condition for the digital broadcast signal; determining which antenna is more appropriate to receive the digital broadcast signal from among the first antenna and the second antenna, depending on the result of sensing; and informing the user which antenna is more appropriate to receive the digital broadcast signal among the first antenna and the second antenna.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted when it may make the subject matter of the present invention unclear. In addition, for the convenience of description, a digital broadcast receiving terminal with two internal antennas configured in a form of diversity is described by way of an example. However, there is no doubt that the present invention can be generally applied to a digital broadcast receiving terminal having a single internal antenna. In addition, the term, "digital broadcast receiving terminal" covers all kinds of composite terminals capable of receiving a digital broadcast signal, that is, a mobile communication terminal, a multimedia player, etc. that are capable of receiving a digital broadcast signal. Furthermore, although it is described herein that a signal received through an internal antenna or an external antenna of the inventive digital broadcast receiving terminal is referred to as a digital broadcast signal, there is no doubt that the present invention can be also applied to an RF signal received through an internal antenna or an external antenna, and the term, "digital broadcast signal" covers a digital multimedia broadcasting (DMB) signal.

A digital broadcast receiving terminal according to an embodiment of the present invention includes an external antenna detachably assembled with the outside of the terminal, and two internal antennas basically provided in the terminal and configured in a form of diversity. In addition, when the external antenna is mounted, any one of the internal antennas is switched with the external antenna so that the external antenna can be connected with an RF unit.

Figure 1:
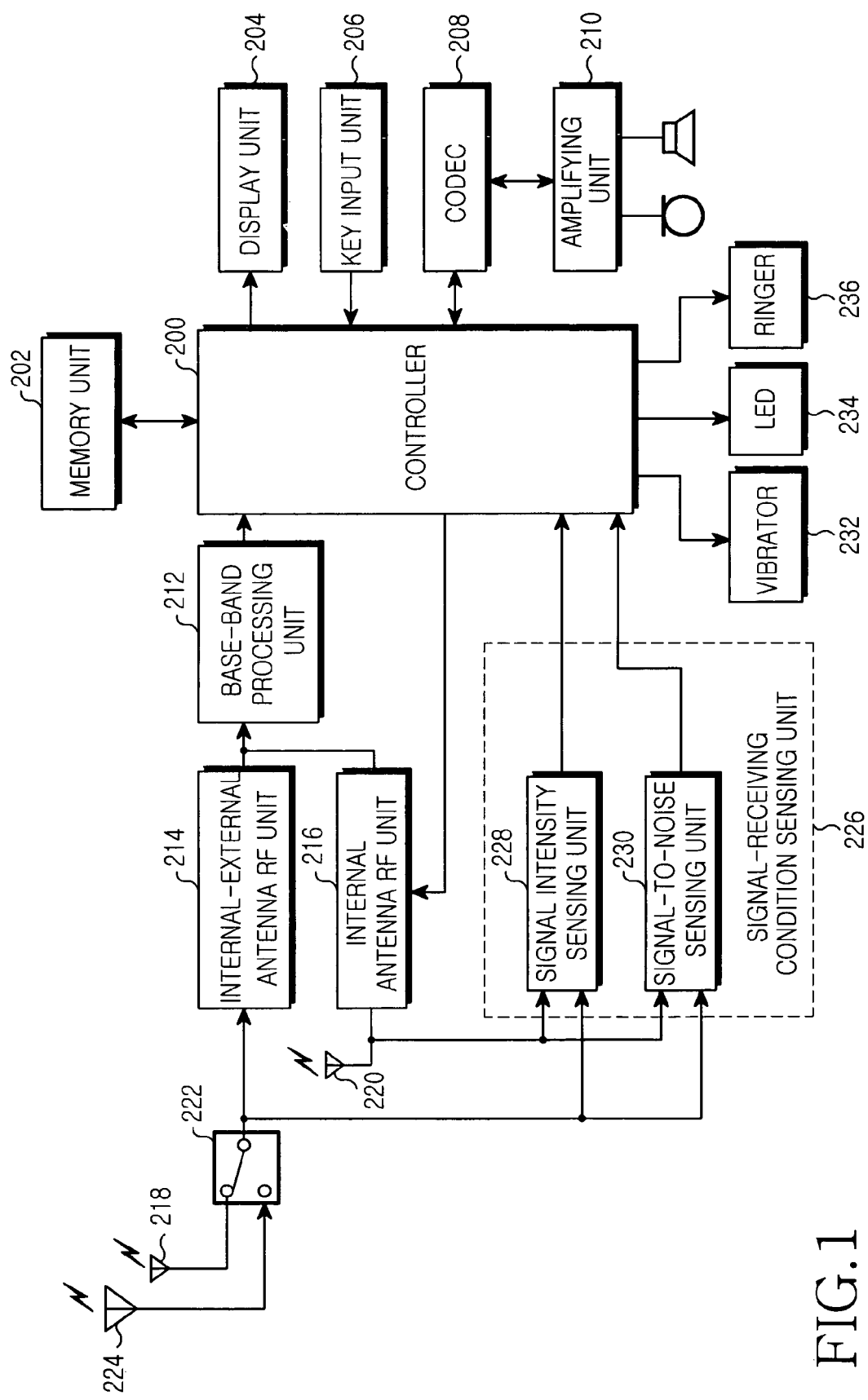
FIG. 1 is a block diagram of a digital broadcast receiving terminal according to an embodiment of the present invention.

FIG. 1 is a block diagram showing a digital broadcast receiving terminal according to the present invention configured as described above. Referring to FIG. 1, the inventive digital broadcast receiving terminal includes a memory unit 202, a key input unit 206, a display unit 204, a base-band processing unit 212, a switch unit 222, an internal-external antenna RF unit 214, an internal antenna RF unit 216, a signal-receiving condition sensing unit 226, a vibrator 232, a light emitting diode (LED) 234, a ringer 236, a Coder-Decoder (CODEC) 208, internal antennas 218 and 220, and an external antenna 224, all of which are connected to a controller 200.

Here, the controller 200 receives a digital broadcast signal, which contains image data, audio data, and/or information data, from a satellite or a base station for relaying a digital broadcast signal. Then, the controller 200 causes the digital broadcast signal to be decoded by the base-band processing unit 212, in such a way that the image data can be displayed on the display unit 204 and the audio data can be output as an audible signal through the connected CODEC 208. In addition, according to a user's key input, the controller 200 allows information data such as an electronic programming guide (EPG) to be displayed through the display unit 204. Moreover, if the digital broadcast receiving terminal implements a telephonic function, the controller 200 can process a voice signal and a data signal according to a protocol for telephone transmission, data communication, or wireless Internet access. In addition, according to the present embodiment, the controller 200 determines whether an antenna is in a condition capable of receiving a digital broadcast signal on the basis of a result from sensing the signal-receiving condition for a received signal, which condition is input from the signal-receiving condition sensing unit 226. In addition, the controller 200 informs the user of the result using vibration produced by the vibrator 232, light produced by the LED 234, voice information through the speaker, or a screen displayed on the display unit 204. If the user mounts an external antenna 224, the controller 200 cuts off the power supply to the internal antenna RF unit 216 connected to the first internal antenna 220, thereby reducing unnecessary power consumption.

The controller 200 confirms whether a preset test period expires and causes the power supply to the internal antenna RF unit 216 to be cut off according to the test period. In addition, the controller 200 senses the signal-receiving condition for a digital signal received through the internal antenna 220. If it is determined that the digital signal can be satisfactorily received through the internal antenna 220, the controller 200 informs the user of this situation. Furthermore, if it is sensed that the external antenna 224 has been removed by the user, the controller 200 receive a digital broadcast signal through the internal antennas 218, 220 and informs the user whether the external antenna is required.

The signal-receiving condition sensing unit 226 includes a signal intensity sensing unit 228 for sensing the intensity of a signal received through the internal antenna 220 or the external antenna 224, and a signal-to-noise ratio sensing unit 230 for sensing the signal-to-noise ratio of the same received signal. If the received signal is input into the signal-receiving condition sensing unit 226, the signal intensity sensing unit 228 senses the intensity of the received signal, the result of which is input into the controller 200. If the signal intensity of the received signal is not less than a preset threshold of signal intensity, the controller 200 determines whether the signal-to-noise ratio of the received signal, which is input from the signal-to-noise ratio sensing unit 230, is not less than a preset threshold of signal-to-noise ratio. In addition, if the intensity of the received signal is not less than the preset threshold of signal intensity or the signal-to-noise ratio is not less than the preset threshold of signal-to-noise ratio, the controller 200 determines that the current signal-receiving condition permits receiving the digital broadcast signal.

The memory unit 202 connected with the controller 200, includes a read only memory (ROM), a flash memory and a random access memory (RAM). The ROM stores various reference data and programs for processing and controlling the operations of the controller 200. The RAM provides a working memory for the controller 200, and the flash memory provides an area for storing various updatable data for custody. The key input unit 206 includes various keys including numerical keys to provide the controller 200 with data input by the user. The display unit typically includes a liquid crystal display (LCD) to process various information into one or more images according to the control of the controller 200. The switch unit 222 renders any one of the second internal antenna 218 and the external antenna to be connected with the internal-external antenna RF unit 214. In general, although the switch unit 222 may be configured with such a hardware switch, there is no doubt that it is possible to make any one of the second internal antenna 218 and the external antenna 224 selectable through the control of the controller 200. When the external antenna 224 is connected, the controller receives a digital broadcast signal through the connected external antenna 224.

The first internal antenna 220 and the second internal antenna 218 are respectively connected with the internal-external antenna RF unit 214 and the internal antenna RF unit 216 to receive a digital broadcast signal. At this time, the first internal antenna 220 and the second internal antenna 218 receive a digital broadcast signal containing image data, audio data, information data or the like from a satellite or a base station, in which the satellite and the base station are each connected to the internal-external antenna RF unit 214 and the internal antenna RF unit 216 to relay a digital broadcast signal. The received digital broadcast signal is input into the base-band processing unit 212. Then, the base-band processing unit 212 decodes the image data, audio data and/or information data from the received digital broadcast signal and inputs the decoded data into the controller 200.

The base-band processing unit 212 provides an interface between the controller 200 and the internal antenna RF unit 216 or the internal-external antenna RF unit 214, decodes the digital broadcast signal applied from the internal antenna RF unit 216 or the internal-external antenna RF unit 214 and applies the decoded signal to the controller 200. The CODEC 208 connected with the controller 200 is connected to a microphone and a speaker through an amplifying unit 210, in which the CODEC 208 decodes the audio data input from the controller 200 and outputs the decoded data to the speaker through the amplifying unit 210. The amplifying unit 210 amplifies a voice signal input from the microphone or output to the speaker and tunes the volume of the speaker or the gain of the microphone according to the control of the controller 200. The vibrator 232, the LED and the ringer 236 supply an alarm to the user using vibration, light and bell sound, respectively.

Therefore, when the internal antennas 218, 220 are used, the inventive digital broadcast receiving terminal senses the signal-receiving condition for a digital broadcast signal input through the internal antenna RF unit 216 and the internal-external antenna RF unit 214, through the signal-receiving condition sensing unit 226, and informs the user whether the external antenna 224 is required or not depending on the result of sensing. Therefore, the user can instantly recognize whether or not it is the time to use the external antenna. As a result, the user is not inconvenienced by unnecessarily using the external antenna. In addition, when the external antenna 224 is used, the power supply to the internal antenna RF unit 216 is cut off, thereby reducing unnecessary power consumption. When the external antenna 224 is being used and power is turned off to the internal antenna RF unit 216, power is reapplied at every preset test period to determine the signal-receiving condition for a digital broadcast signal received from the first internal antenna 220. If it is determined that the signal-receiving condition is satisfactory for use of the internal antennas, the user is informed of this situation. Accordingly, the user can reduce the length of time for using the external antenna 224, and thereby reduce the user's inconvenience caused by using the external antenna 224.

Figure 2:
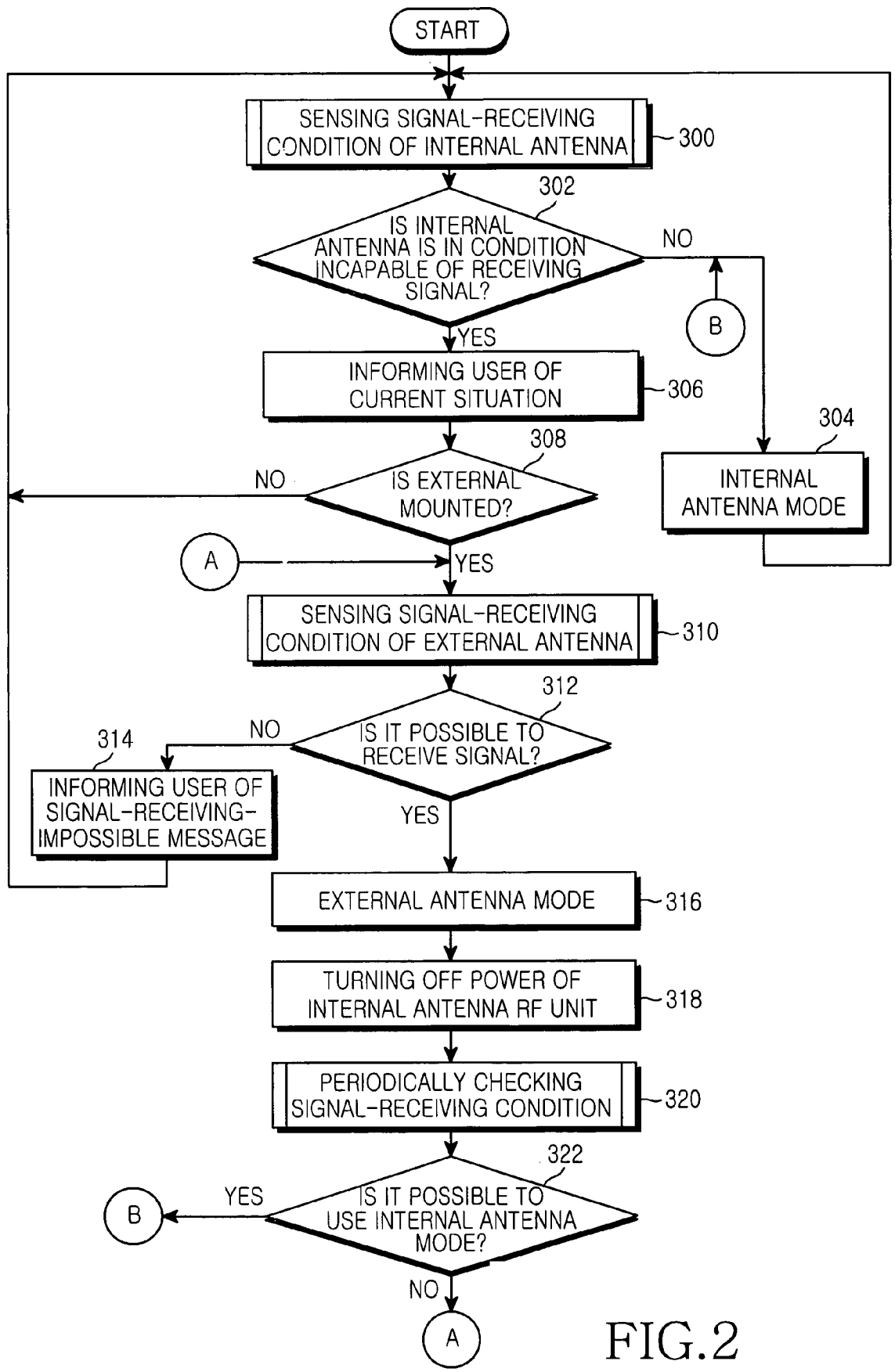
FIG. 2 is a flowchart of control operation according to a signal-receiving condition of an antenna of a digital broadcast receiving terminal according to an embodiment of the present invention.

FIG. 2 shows control operations of the controller 200 according to the signal-receiving condition of an antenna of a digital broadcast receiving terminal. Referring to FIG. 2, if power is input to a digital broadcast receiving terminal according to an embodiment of the present invention, the controller 200 proceeds to step 300 to sense the signal-receiving condition for a digital broadcast signal input from the internal antennas 218, 220 through the signal-receiving condition sensing unit 226. Now, the operation for sensing the signal-receiving condition of the internal antennas 218, 220 is described with reference to FIG. 3A.

In step 300, if the signal-receiving condition for a digital broadcast signal input from the internal antennas 218, 220 is sensed, the controller 200 proceeds to step 302 to determine whether the internal antennas 218, 220 are currently in the condition capable of receiving a digital broadcast signal on the basis of the signal-receiving condition sensed in step 300. Here, step 302 for determining whether the current state is in the condition capable of receiving a digital broadcast signal is implemented on the basis of the sensing result for the signal-receiving condition for a digital broadcast signal received through the internal antennas 218, 220, wherein the signal-receiving condition is sensed by the signal-receiving condition sensing unit 226. If the internal antennas 218, 220 are not incapable of receiving a digital broadcast signal, the controller proceeds to step 304 and allows the internal antennas 218, 220 to remain in use. Here, the antenna mode using both of the internal antennas 218, 220 is called an "internal antenna mode."

However, in step 302, if it is determined that the internal antennas 218, 220 are in the condition incapable of receiving a digital broadcast signal, the controller 200 proceeds to step 306 to inform the user that the internal antennas are now incapable of receiving a digital broadcast signal with the internal antenna mode using the internal antennas 218, 220. Various methods can be used in order to inform the user that currently it is impossible to receive a digital broadcast signal with the internal antenna mode in step 306. For example, the digital broadcast receiving terminal may inform the user of the above-mentioned situation using light produced from the LED 234, vibration produced by the vibrator 232, or bell sounds produced by the ringer 236. Alternatively, it is also possible to inform the user of the above-mentioned situation by a voice message through the speaker or through an alarm message displayed on the display unit 204. Alarm messages are exemplified in FIGS. 5A through 5C.

Then, the controller 200 proceeds to step 308 to check whether the external antenna 224 is mounted or not. If the mounting of the external antenna 224 is not sensed within a predetermined length of time, the controllers 200 returns again to step 300 and repeats the procedures of step 300 to step 308.

Figure 5A:
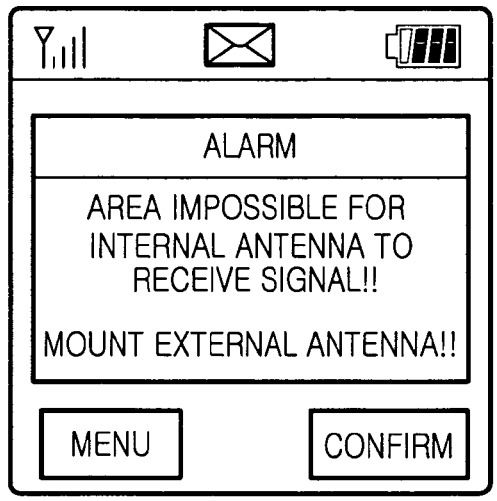
FIGS. 5A through 5C are screens displayed in a digital broadcast receiving terminal according to the signal-receiving condition in a digital broadcast receiving terminal according to an embodiment of the present invention.
Figure 5B:
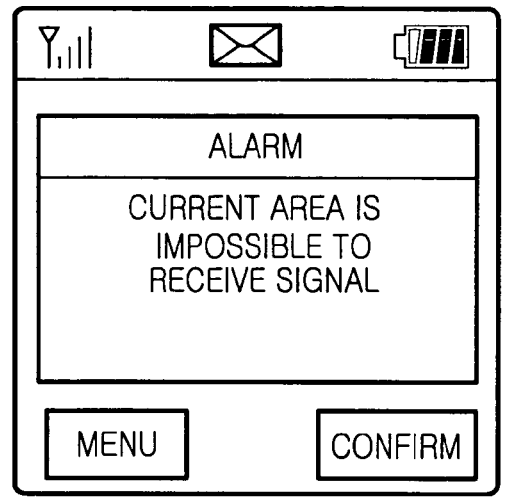
Figure 5C:
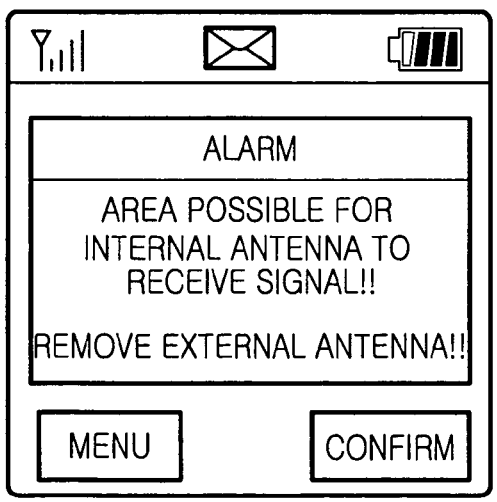

However, if the mounting of the external antenna 224 is sensed in step 308, the controller 200 proceeds to step 310 to sense the signal-receiving condition for a digital broadcast signal received through the external antenna 224. The operation of sensing the signal-receiving condition of the external antenna 224 will later be described in detail with reference to FIG. 3B. The controller 200, which has sensed the signal-receiving condition for the digital broadcast signal received through the external antenna 224, proceeds to step 312 to determine whether the current state of reception is in the condition capable of receiving a digital broadcast signal. If it is determined that the current state is in the condition incapable of receiving the digital broadcast signal, the controller proceeds to step 314 to inform the use that the current state of reception is in the condition incapable of receiving a digital broadcast signal even though the internal antennas 218, 220 and the external antenna 224 are both used. This can be implemented in various ways as in step 306. In this regard, FIGS. 5A through 5C show messages displayed to the user through the display unit 204 by way of example. Then, the controller 200 returns again to step 300 to sense the signal-receiving condition of the internal antennas 218, 220.

However, if it is determined in step 312 that the digital broadcast signal input from the external antenna 224 is in the condition possible to be received, the controller proceeds to step 316, where the controller 200 is switched to the external antenna mode. The "external antenna mode" means the mode in which the controller 200 receives a digital broadcast signal through the external antenna 224. Then, the controller 200 proceeds to step 318 to cut off the power supply to the inner antenna RF unit 216 because the external antenna 224 is generally superior to the internal antennas 218, 220 in signal-receiving sensitivity and thus it is sufficient that the external antenna 224 be used alone in receiving a digital broadcast signal. Therefore, according to the present invention, the controller 200 is adapted to turn off the power of the internal antenna. RF unit 216 so as to prevent unnecessary consumption of electric power when the controller 200 is switched to the external antenna mode for using the external antenna 224.

The controller 200, which has turned off the power of the internal RF unit 216 in step 318, proceeds to step 320 to periodically check the digital broadcast signal-receiving condition of the first internal antenna 220. The reason for periodically checking the signal-receiving condition of the internal antenna 220 is because although the signal-receiving sensitivity and signal-to-noise ratio is greatly increased if the external antenna 224 is used as described above, the user is inconvenienced as the size of the external antenna is very large as compared with those of the internal antennas 218. Therefore, by periodically checking the signal-receiving condition of the first internal antenna in a predetermined test period, if it is determined that the external antenna 224 is not needed any longer (that is, under the condition that the digital broadcast signal can be sufficiently received using the first internal antenna 220 only), the external antenna 224 can be removed in order to reduce the user's inconvenience.

The controller 200, which has checked the signal-receiving condition of the first internal antenna 220 in step 320, proceeds to step 322 to sense the signal-receiving condition for a digital broadcast signal received through the internal antenna 220, thereby to determine whether the internal antenna 220 is in a condition incapable of receiving a digital broadcast signal. If it is possible to receive a digital broadcast signal through the internal antenna, the controller 200 proceeds to step 304, where the controller is switched to internal antenna mode, and returns again to step 300. However, if it is determined that it is impossible to receive a digital broadcast signal through the internal antenna mode in step 322, the controller proceeds to step 310 to sense again the digital broadcast signal-receiving condition of the external antenna. Therefore, the digital broadcast receiving terminal according to the present embodiment senses the signal-receiving condition for a digital broadcast signal received in the present antenna mode and informs the user that the mounting or removal of the external antenna 224 is needed depending on the signal-receiving condition it has sensed. Consequently, it is possible for the user to use the external antenna 224 only for the required period, whereby the inconvenience caused by unnecessarily using the external antenna 224 can be reduced.

Figure 3A:
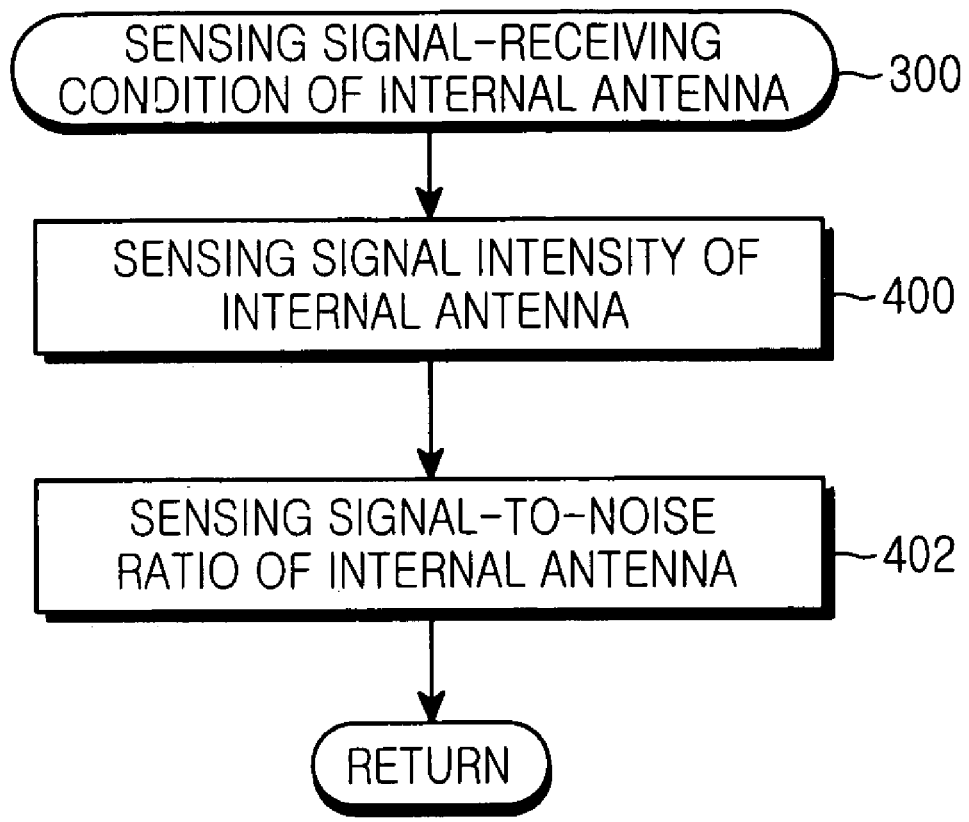
FIG. 3A is a flowchart for an operation of sensing a signal-receiving condition for a digital broadcast signal through an internal antenna in a digital broadcast receiving terminal according to an embodiment of the present invention.
Figure 3B:
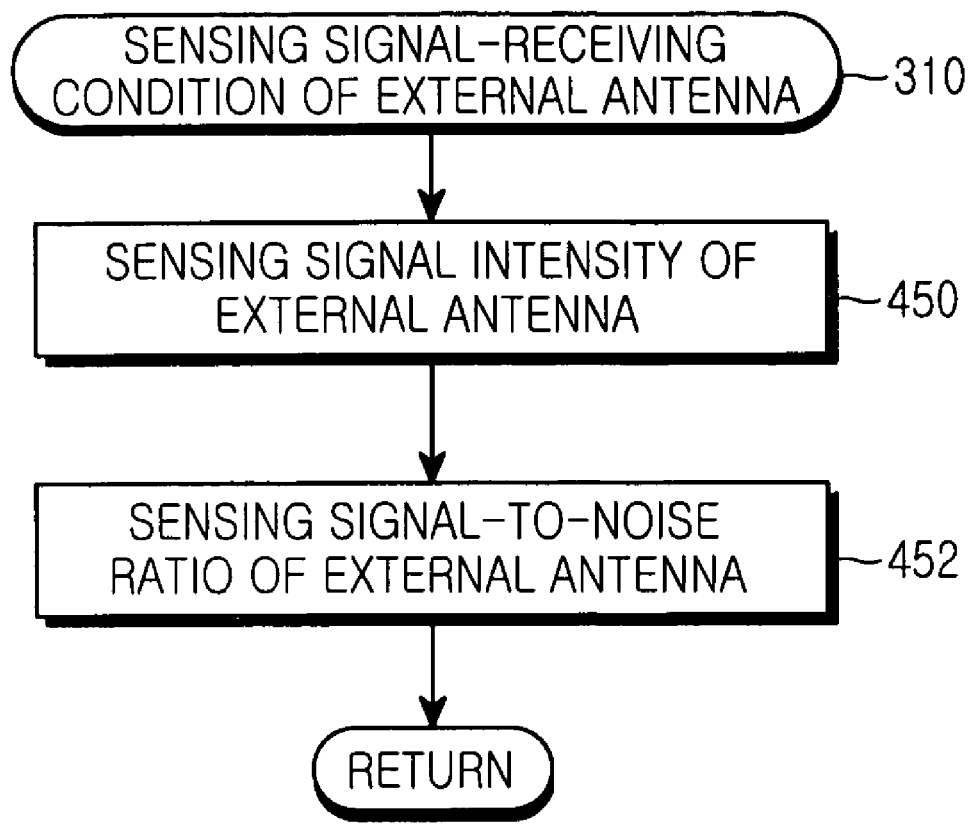
FIG. 3B is a flowchart for an operation of sensing a signal-receiving condition for a digital broadcast signal through an external antenna in a digital broadcast receiving terminal according to an embodiment of the present invention.

FIGS. 3A and 3B show the operations for sensing the signal-receiving condition of the internal antennas 218, 220 or the external antenna 224. FIG. 3A shows step 300 for sensing the signal-receiving condition of the inner antennas 218, 220 (in FIG. 2) in more detail. FIG. 3B shows step 310 for sensing the signal-receiving condition of the external antenna 224 (in FIG. 2) in more detail. Referring to FIG. 3A, if step 300 for sensing the signal-receiving condition of the internal antennas 218, 220 (in FIG. 2) is proceeded with, the controller 200 proceeds to step 400, where the result of sensing the signal intensity of a digital broadcast signal received through the internal antennas 218, 220 is input into the controller 200 from the signal intensity sensing unit 228. Then, the controller 200 proceeds to step 402, where the result of sensing the signal-to-noise ratio of the digital broadcast signal is input into the controller 200 from the signal-to-noise ratio sensing unit 230. Then, the controller 200 determines whether the intensity and the signal-to-noise ratio of a digital broadcast signal, which are received in step 400 and step 402, respectively, are not less than the preset thresholds or not through comparison, thereby determining whether the current state of reception is in the condition capable of receiving a digital broadcast signal through the internal antennas 218, 220. Referring to FIG. 3B, if it is sensed that the external antenna 224 is now mounted, the controller 200 proceeds to step 310 to sense the signal-receiving condition of the currently connected external antenna 224. In addition, if step 310 is proceeded with, the controller 200 proceeds to step 450, where the result of sensing the intensity of a digital broadcast signal received through the external antenna 224 is input into the controller 200 from the signal intensity sensing unit 228. Then, the controller 200 proceeds to step 452, where the result of sensing the signal-to-noise ratio of the digital broadcast signal is input into the controller 200 from the signal-to-noise ratio sensing unit 230. Then, the controller 200 determines whether the signal intensity and the signal-to-noise ratio of the digital broadcast signal, which are received in step 450 and step 452, respectively, are not less than the preset thresholds or not through comparison, thereby determining whether the current state of reception is in the condition capable of receiving a digital broadcast signal through the external antenna 224.

Figure 4:
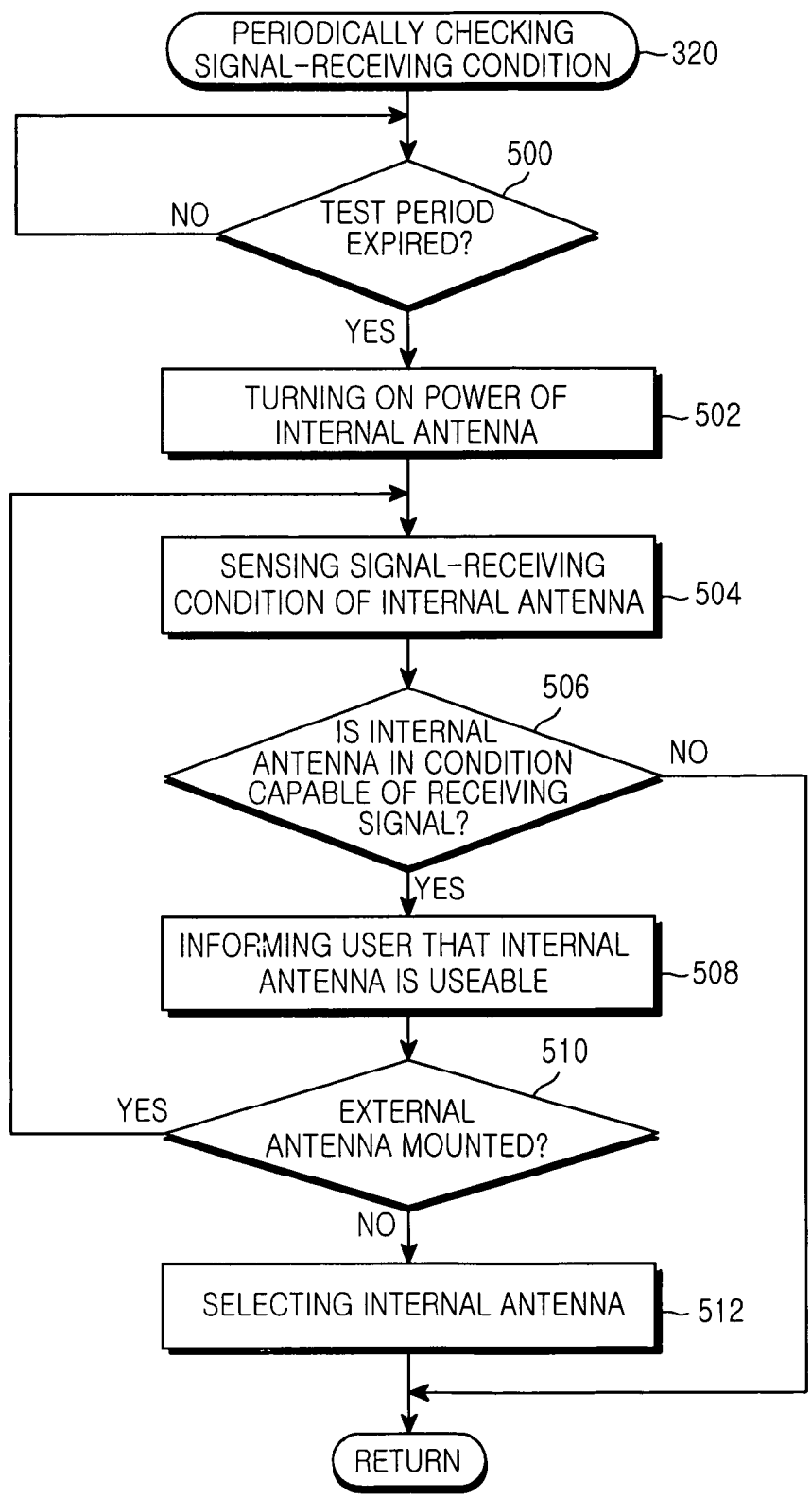
FIG. 4 is a detailed flowchart for an operation of periodically checking the signal-receiving condition for a digital broadcast receiving terminal according to an embodiment of the present invention.

FIG. 4 shows the process of step 300 for periodically checking the signal-receiving condition for a digital broadcast signal through the first internal antenna 220 (in FIG. 2) in more detail. Referring to FIG. 4, if step 320 for periodically checking the signal-receiving condition for a digital broadcast signal (in FIG. 2) is initiated, the controller 200 proceeds to step 500 for determining whether the preset test period expires or not. If it is determined that the preset test period has expired in step 500, the controller 200 proceeds to step 502, where the controller is temporarily switched to the internal antenna mode. As a result, if step 502 is proceeded with, the internal antenna RF unit 216, for which the power has been turned off in step 318 of FIG. 2, is temporarily turned on if the test period has expired. If the power of the internal antenna RF unit 216 is turned on in this manner, the controller proceeds to step 504 to sense again the signal-receiving condition for a digital broadcast signal received through the first antenna 220. Here, the processes for sensing the signal-receiving condition of the first internal antenna 220 is implemented by sensing the signal intensity and signal-to-noise ratio of the digital broadcast signal received through the first antenna 220 like the processes shown in FIGS. 3A and 3B.

In addition, the controller 200 proceeds to step 506 to determine whether the current state of reception is in the condition capable of receiving a digital broadcast signal, on the basis of the signal-receiving condition for the digital broadcast signal received through the first antenna 220, sensed in step 504. Here, step 506 is implemented by the result of sensing input from the signal-receiving condition sensing unit 226 in step 504. That is, if the intensity of the digital broadcast signal input from the signal intensity sensing unit 228 is not less than the preset threshold or if the signal-to-noise ratio of the digital broadcast signal input through the signal-to-noise ratio sensing unit 230 is not less than the preset threshold, the controller determines that the current state of reception is in the condition capable of receiving the digital broadcast signal through the first internal antenna 220. If the first internal antenna 220 is in the condition capable of receiving a digital broadcast signal, the controller 200 determines that the current state of reception is in the condition capable of receiving the digital broadcast signal through the internal antennas 218, 220.

If the internal antennas 218, 220 are still not in the condition capable of receiving a broadcasting signal, the controller 220 retains the current external antenna mode for using the external antenna 224. However, if the internal antennas 218, 220 in step 506 are in the condition capable of receiving the digital broadcast signal, the controller 200 proceeds to step 508 to inform the user that the digital broadcast signal can be received using the internal antennas 218, 220 and the external antenna 224 is no longer required. To inform the user of this situation in step 508, it is possible to use light emitted from the LED 234, vibration produced by the vibrator 232, bell sound of the ringer 236 or voice message through the speaker, and it is also possible to display a message containing certain information using the display unit 204. Display screens are exemplified in FIGS. 5A through 5C.

Furthermore, the controller 200, which has informed the user that the external antenna 224 is not required any more, proceeds to step 510 to check the mounted condition of the external antenna 224. If the external antenna 224 is still mounted after a predetermined length of time has passed, the controller 200 proceeds to step 504 to sense the signal-receiving condition of the internal antennas 218, 220 again. The procedure from step 506 to step 510 is repeated. If the external antenna 224 is no longer sensed in step 510, the controller 200 proceeds to step 512 to receive a digital broadcast signal using the internal antennas 218, 220 currently connected to the controller. Therefore, the digital broadcast receiving terminal periodically checks the signal-receiving condition of the internal antennas 218, 220 to confirm whether the current state is in the condition possible to use the internal antennas 218, 220. If it is possible to use the internal antennas 218, 220, the controller informs the user of this situation, so that the user does not use the external antenna 224 any longer than necessary. Therefore, it is possible to prevent the external antenna 224 from being unnecessarily used in an area where the internal antennas 218, 220 can be used.

As described above, the controller 200 of the inventive digital broadcast receiving terminal can inform the user of a condition requiring the external antenna 224, a condition in which it is impossible to receive a digital broadcast signal even if both of the internal antennas 218, 220 and the external antenna 224 are used, and a condition not requiring the external antenna 224 any more. Notification is provided using the LED 234, the vibrator 232, ringer 236 or voice message through the speaker, wherein the user can be additionally informed of the current situation in more detail through a message displayed on the display unit 204.

FIGS. 5A through 5C show screens displayed with messages corresponding to each situation by way of example. FIG. 5A is an example of a screen for informing that the current state of reception is in the condition incapable of receiving a digital broadcast signal with the internal antenna mode using the internal antennas 218, 220, FIG. 5B is an example of a screen for informing that the current state of reception is in the condition incapable of receiving a digital broadcast signal using not only the internal antennas 218, 220 but also the external antenna 224. FIG. 5C is an example of a screen informing that it is possible to receive a digital broadcast signal using the internal antennas 218, 220 and that the external antenna 224 is not required any more. In this way, the inventive digital broadcast receiving terminal is able to inform the user of the digital broadcast signal-receiving condition in the current antenna mode not only using any of the LED 234, the vibrator 232 and the ringer 236 but also using a screen displayed on the display unit 204.

Figure 6:
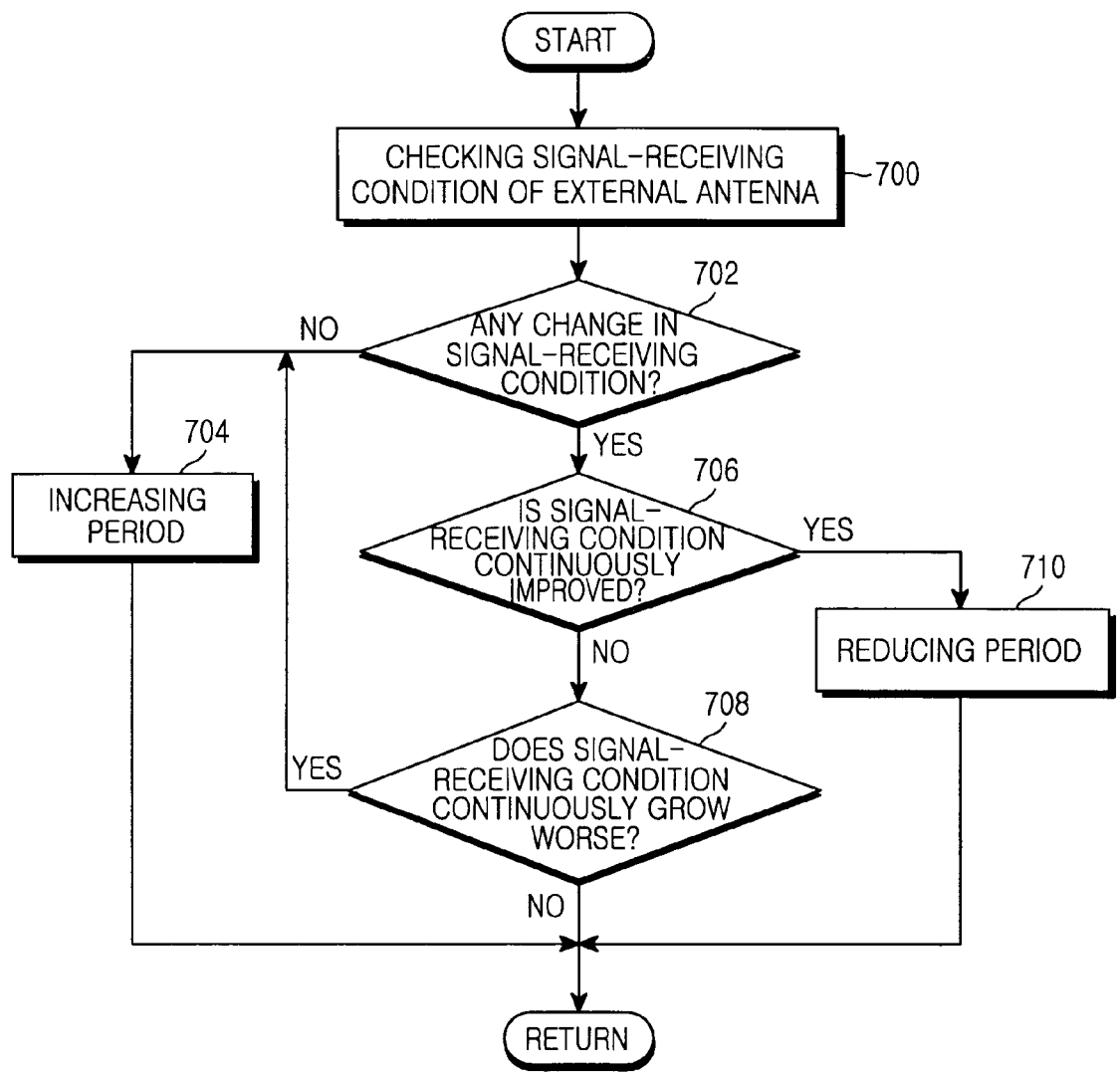
FIG. 6 is a detailed flowchart of a process for determining a test period in a digital broadcast receiving terminal according to an embodiment of the present invention.

FIG. 6 shows a procedure determining a test period as described above with reference to FIG. 4. If is, of course, possible to consistently use a preset test period. According to the present invention, however, it is preferable to make the test period variably tuned depending on the signal-receiving condition of the currently used antenna. Variably turning the test period can further reduce the length of time for unnecessary use of the external antenna 224 as compared to the case of fixedly using the preset test period. The procedure for determining the test period may be initiated when the digital broadcast receiving terminal is powered on. Alternatively, the procedure for determining the test period may be initiated when the antenna mode is switched from the internal antenna mode to the external antenna mode or from the external antenna mode to the internal mode.

FIG. 6 shows the procedure for determining a test period when the external antenna 224 is mounted by the user, that is, when the antenna mode is switched from the internal antenna mode to the external antenna mode. Referring to FIG. 6, the controller 200 proceeds to step 700 to continuously check the signal-receiving condition of the external antenna 224 with a predetermined time interval. The controller 200 then proceeds to step 702 to determine whether there is any change in the digital broadcast signal-receiving condition. If there is no change in the digital broadcast signal-receiving condition in step 702, the controller 200 determines that the current signal-receiving condition is stable and proceeds to step 704 to increase the preset test period. Therefore, if step 704 is initiated, the internal antennas 218, 220 are temporarily powered on at the time of using the external antenna 224, and the length of time for sensing the digital broadcast signal-receiving condition in the internal antenna mode will be increased.

However, if there is any change in the signal-receiving condition in step 702, the controller 200 proceeds to step 706 to determine whether the change means that the signal-receiving condition is continuously improved. The description, "the signal-receiving condition is improved" means that as the result of sensing the signal-receiving condition, sensing unit 226, the receiving intensity of the received digital broadcast signal becomes steadily increased and the signal-to-noise ratio of the received digital broadcast signal becomes steadily increased. In addition, if the digital broadcast signal-receiving condition is continuously improved, the controller proceeds to step 710 to reduce the test period. Therefore, when the external antenna 224 is used, the internal antennas 218, 220 are temporarily powered on and the time interval for receiving the digital broadcast signal-receiving condition in the internal antenna mode will be reduced. The reason for reducing the test period when the broadcasting signal-receiving condition is continuously improved is to check the signal-receiving condition of the internal antennas 218, 220 more frequently by reducing the test period, so that the user can remove the external antenna 224 as quickly as possible.

If the digital broadcast signal-receiving condition is not continuously improved in step 706, the controller proceeds to step 708 to determine whether the signal-receiving condition continuously grows worse. If the signal-receiving condition continuously grows worse, the controller 200 proceeds to step 704 to increase the test period. However, if the signal-receiving condition does not continuously grow worse in step 708, that is, if a good signal-receiving condition and a bad signal-receiving condition are alternately repeated, the controller 200 terminates the procedure for determining the test period and retains the current test period as it is. Here, the description, "the signal-receiving condition grows worse" means that, based on the sensed result of the signal-receiving condition sensing unit 226, the intensity of the received digital broadcast signal becomes steadily increased weakened and the signal-to-noise ratio of the received digital broadcast signal becomes also steadily more reduced. In addition, if the procedure for determining the test period as described above is initiated again, the controller 200 returns again to step 700 to continuously check the signal-receiving condition of the external antenna 224 with a predetermined time interval. Therefore, if the external antenna mode using the external antenna is employed in the inventive digital broadcast receiving terminal, the signal-receiving condition of the external antenna 224 is checked for a predetermined length of time and the test period is tuned depending on the signal-receiving condition. This permits the user to more quickly recognize the situation in which the external antenna 224 is no longer required, as compared to the case of fixedly using a predetermined period, thereby making it possible to reduce the length of time the external antenna 224 is unnecessarily used.

In addition to the basic internal antennas provided in the form of diversity, the present invention includes a detachable external antenna. The present invention further includes a switch unit for selecting any one of the external or internal antennas. A signal-receiving condition sensing unit, which can sense the signal-receiving condition for a digital broadcast signal received from the internal antennas and the external antenna, is also provided to sense the signal-receiving condition for a digital broadcast signal received from the internal antennas and the external antenna. In addition, the controller of the inventive digital broadcast receiving terminal senses the signal-receiving condition of the internal antennas, and when it is determined that it is impossible to receive a digital broadcast signal, the controller informs the use of this situation so that the user can mount the external antenna. Furthermore, if the external antenna is mounted, the controller supplies power only to an RF unit connected to the external antenna and cuts off the power supply to the remaining RF unit, so that power consumption can be reduced. In the external antenna mode in which the external antenna is used, the controller periodically senses the signal-receiving condition of the internal antennas according to a test period determined through a procedure of determining the test period. If it is determined that it is possible to receive a digital broadcast signal through the internal antennas, the controller informs the user of this situation so that the user can remove the external antenna.

In addition to internal antennas, the present invention includes a detachable external antenna, a switching unit capable of selecting any of the external antenna and the internal antennas, and a signal-receiving condition sensing unit capable of sensing the signal-receiving condition of the internal antennas and the external antenna. If it is impossible to receive a digital broadcast signal using the internal antennas, the external antenna is used. In addition, if the external antenna is mounted, power is supplied only to an RF unit connected to the external antenna and the power supply to the remaining RF unit is cut off, thereby reducing power consumption. If it is determined that it is possible to receive a digital broadcast signal through the internal antennas, the user can be informed of this situation. As a result, it is possible to reduce the power unnecessarily consumed by operating the internal RF unit. It is also possible to minimize the length of time that the external antenna is unnecessarily used, thereby reducing the user's inconvenience caused by using the external antenna.

While the invention has been shown and described with reference to certain preferred embodiments thereof, various changes and modifications can be made without departing from the scope and spirit of the present invention as defined by the appended claims. In particular, although a digital broadcast receiving terminal having internal antennas in the form of diversity was described in the description of embodiments of the present intention by way of example, this is merely to help the understanding of the present invention. There is no doubt that the present invention can be also applied to a digital broadcast receiving terminal having an internal antenna which is not in the form of diversity. For example, a digital broadcast receiving terminal having a single internal antenna may separately include an internal antenna RF unit and an external antenna RF unit, so that the power supply to the internal antenna RF unit can be cut off when the external antenna is used.

Although it has been described that the signal-receiving condition sensed by the signal-receiving condition sensing unit is determined on the basis of the intensity and the signal-to-noise ratio of a received digital broadcast signal, there is no doubt that the signal-receiving condition can be determined on the basis of only one of the intensity and the signal-to-noise ratio. For example, it is possible for the controller to recognize whether it is possible to receive a digital broadcast signal, on the basis of the intensity of a received digital broadcast signal only. In addition, although it has been described that the internal antennas or the external antenna receive a digital broadcast signal in the description of embodiments above, there is no doubt that internal antennas or the external antenna can receive a conventional RF signal. Therefore, the scope of the present invention shall be determined by the appended claims and equivalents thereof rather than by the embodiments described above.

What is claimed is:

1. An apparatus for selecting an antenna in a digital broadcast receiving terminal, the apparatus comprising:
   at least one fixed internal antenna;
   at least one external antenna which is detachably assembled on an outside of the digital broadcast receiving terminal;
   a signal-receiving condition sensing unit for sensing a signal-receiving condition for a digital broadcast signal input from the internal antenna and the external antenna; and
   a controller for periodically comparing sensing results of the internal antenna and the external antenna with predetermined thresholds according to a predetermined test period and informing a user that the internal antenna is capable of being used even though the external antenna is capable according to the comparing result,
   wherein, if the signal-receiving condition for the digital broadcast signal improves for a predetermined length of time, the controller reduces the predetermined test period and
   if the signal-receiving condition for the digital broadcast signal worsens for the predetermined length of time, the controller increases the predetermined test period.

2. The apparatus as claimed in claim 1, further comprising:
   a first RF unit for receiving a broadcasting signal through one of the external antenna and the internal antenna; and
   a second RF unit for receiving the broadcasting signal through a remaining antenna other than the antenna connected to the first RF unit.

3. The apparatus as claimed in claim 1, wherein, when receiving the digital broadcast signal through the external antenna, the controller senses the signal-receiving condition for a digital signal input into the internal antenna and determines that the internal antenna is more appropriate to receive the digital broadcast signal if the internal antenna is capable of being used.

4. The apparatus as claimed in claim 2, wherein, in a case ot receiving the digital broadcasting signal through the external antenna, the controller cuts off the power supply to the second RF Unit.

5. The apparatus as claimed in claim 1, wherein the signal-receiving condition sensing unit comprises a sensing unit for sensing an intensity of a digital broadcast signal received through the external antenna or the internal antenna.

6. An apparatus as claimed in claim 1, wherein the signal-receiving condition sensing unit comprises a sensing unit for sensing a signal-to-noise ratio of a digital broadcast signal received through the external antenna or the internal antenna.

7. The apparatus as claimed in claim 5, wherein, if the intensity of the digital broadcast signal is stronger than a predetermined threshold of signal intensity, the controller determines that the current state of reception is in a condition capable of receiving the digital broadcast signal, and if not, the controller determines that the current state of reception is in a condition incapable of receiving the digital broadcast signal.

8. An apparatus as claimed in claim 6, wherein, if the signal-to-noise ratio of the digital broadcast signal is larger than a predetermined threshold of signal-to-noise ratio, the controller determines that the current state of reception is in the condition capable of receiving the digital broadcast signal, and if not, the controller determines that the current state of reception is in a condition incapable of receiving the digital broadcast signal.

9. The apparatus as claimed in claim 7, wherein, in a case of receiving a digital broadcast signal through the internal antenna, if the current state of reception is in the condition incapable of receiving the digital broadcast signal as a result of sensing the signal-receiving condition for the digital broadcast signal received through the internal antenna, the controller determines that the external antenna is more appropriate to receive the digital broadcast signal.

10. The apparatus as claimed in claim 8, wherein, in a case of receiving a digital broadcast signal through the internal antenna, if the current state of reception is in the condition incapable of receiving the digital broadcast signal as a result of sensing the signal-receiving condition for the digital broadcast signal received through the internal antenna, the controller determines that the external antenna is more appropriate to receive the digital broadcast signal.

11. The apparatus as claimed in claim 9, wherein, if it is determined that the external antenna is more appropriate to receive the digital broadcast signal, the controller politics the user to mount the external antenna through at least one of a light emitting diode (LED), a vibrator, a ringer, a speaker and a display unit of the digital broadcast receiving terminal.

12. The apparatus as claimed in claim 10, wherein, if it is determined that the external antenna is more appropriate to receive the digital broadcast signal, the controller notifies the user to mount the external antenna through at least one of a light emitting diode (LED), a vibrator, a ringer, a speaker and a display unit of the digital broadcast receiving terminal.

13. The apparatus as claimed in claim 7, wherein, in a case of receiving the digital broadcast signal through the internal antenna, if the current state of reception is in the condition incapable of receiving the digital broadcast signal, the controller informs the user that now it is impossible to receive the digital broadcast signal through at least one of a light emitting diode (LED), a vibrator, a ringer, a speaker and a display unit of the digital broadcast receiving terminal.

14. The apparatus as claimed in claim 8, wherein, in a case of receiving the digital broadcast signal through the internal antenna, if the current state of reception is in the condition incapable of receiving the digital broadcast signal, the controller informs the user that now it is impossible to receive the digital broadcast signal through at least one of a light emitting diode (LED), a vibrator, a ringer, a speaker and a display unit of the digital broadcast receiving terminal.

15. The apparatus as claimed in claim 3, wherein, if the signal intensity of the digital broadcast signal is not less than the preset threshold of signal intensity and the signal-to-noise ratio of the digital broadcast signal is not less than a preset threshold of signal-to-noise ratio as a result of sensing the signal-receiving condition for the digital broadcast signal received through the internal antenna, the controller determines that it is possible to use the internal antenna.

16. The apparatus as claimed in claim 1, wherein, when receiving the digital broadcast signal through the external antenna, the controller sets the predetermined test period depending on the result of sensing the signal-receiving condition for the digital broadcast signal received through the external antenna.

17. The apparatus as claimed in claim 16, wherein, as a result of sensing the signal-receiving condition for the digital broadcast signal received through the external antenna, if an intensity of the digital broadcast signal is steadily increased, the controller determines that the signal-receiving condition improves, and if the intensity of the digital broadcast signal is steadily decreased, the controller determines that the signal-receiving condition worsens.

18. The apparatus as claimed in claim 16, wherein, as a result of sensing the signal-receiving condition for the digital broadcast signal received through the external antenna, if a signal-to-noise ratio of the digital broadcast signal is steadily increased, the controller determines that the signal-receiving condition improves, and if the signal-to-noise ratio of the digital broadcast signal is steadily decreased, the controller determines that the signal-receiving condition worsens.

19. The apparatus as claimed in claim 18, wherein, as a result of sensing the signal-receiving condition for the digital broadcast signal received through the external antenna, if the signal-receiving condition for the digital broadcast signal improves for the predetermined length of time, the controller reduces the predetermined test period and if the signal-receiving condition for the digital broadcast signal worsens for the predetermined length of time, the controller increases the predetermined test period.

20. An apparatus as claimed in claim 17, wherein, as a result of sensing the signal-receiving condition for the digital broadcast signal received through the external antenna, if the signal-receiving condition for the digital broadcast signal worsens for the predetermined length of time, the controller increases the predetermined test period.

21. An apparatus as claimed in claim 18, wherein, as a result of sensing the signal-receiving condition for the digital broadcast signal received through the external antenna, if the signal-receiving condition for the digital broadcast signal worsens for the predetermined length of time, the controller increases the predetermined test period.

22. The apparatus as claimed in claim 1, wherein the digital broadcast receiving terminal is a mobile communication terminal capable of receiving the digital broadcast signal.

23. A method for selecting an antenna in a digital broadcast receiving terminal including at least one internal antenna, which is fixed in the digital broadcast receiving terminal, and at least one external antenna, which is detachably assembled on the outside of the digital broadcast receiving terminal, the method comprising steps of:
  receiving a digital broadcast signal through one of the external antenna and the internal antenna;
  sensing a signal-receiving condition for the digital broadcast signal input from the internal antenna and the external antenna;
  periodically comparing sensing results of the internal antenna and the external antenna with predetermined thresholds according to a predetermined test period;
  determining which antenna is more appropriate to receive the digital broadcast signal among the internal antenna and the external antenna depending on the comparison result; and informing a user which antenna is more appropriate to receive the digital broadcast signal among the external antenna and the internal antenna, wherein, the predetermined test period is reduced if the signal-receiving condition for the digital broadcast signal improves for a predetermined length of time1 and the predetermined test period is increased if the signal-receiving condition for the digital broadcast signal worsens for the predetermined length of time.

24. The method as claimed in claim 23, wherein the step of sensing the signal-receiving condition comprises sensing a signal intensity and a signal-to-noise ratio of the digital broadcast signal.

25. The method as claimed in claim 23, wherein, in the step of determining an appropriate antenna, when receiving the digital broadcast signal through the internal antenna, if the signal intensity of the digital broadcast signal is less than a preset threshold of signal intensity, it is determined that the internal antenna is not appropriate to receive the digital broadcast signal, and if not, it is determined that the internal antenna is appropriate to receive the digital broadcast signal.

26. The method as claimed in claim 23, wherein, if it is determined that the internal antenna is not appropriate to receive the digital broadcast signal, the step of determining an appropriate antenna comprises informing the user to mount the external antenna.

27. The method as claimed in claim 23, wherein, in the step of determining an appropriate antenna, in a case of receiving the digital broadcast signal through the external antenna, if an intensity of the digital broadcast signal is less than a preset threshold of signal intensity, it is determined that the external antenna is not appropriate to receive the digital broadcast signal, and if not, it is determined that the external antenna is appropriate to receive the digital broadcast signal.

28. The method as claimed in claim 27, wherein, if it is determined that the external antenna is not appropriate to receive the digital broadcast signal, the step of determining an appropriate antenna comprises informing the user that it is now impossible to receive the digital broadcast signal.

29. A method as claimed in claim 23, wherein the step of sensing the signal-receiving condition comprises a step of sensing a signal-to-noise ratio of the digital broadcast signal.

30. A method as claimed in claim 29, wherein, in the step of determining an appropriate antenna, in a case of receiving the digital broadcast signal through the internal antenna, if the signal-to-noise ratio of the digital broadcast signal is less than a preset threshold of signal-to-noise ratio, it is determined that the internal antenna is not appropriate to receive the digital broadcast signal, and if not, it is determined that the internal antenna is appropriate to receive the digital broadcast signal.

31. A method as claimed in claim 30, wherein, if it is determined that the internal antenna is not appropriate to receive the digital broadcast signal, the step of determining an appropriate antenna comprises a step of informing the user that it is demanded that the user mount the external antenna.

32. A method as claimed in claim 29, wherein, in the step of determining an appropriate antenna, in the case of receiving the digital broadcast signal through the external antenna, if the signal-to-noise ratio of the digital broadcast signal is less than a preset threshold of signal-to-noise ratio, it is determined that the external antenna is not appropriate to receive the digital broadcast signal, and if not, it is determined that the external antenna is appropriate to receive the digital broadcast signal.

33. A method as claimed in claim 32, wherein, if it is determined that the external antenna is not appropriate to receive the digital broadcast signal, the step of determining an appropriate antenna comprises informing the user that now it is impossible to receive the digital broadcast signal.

34. The method as claimed in claim 25, wherein, in the step of informing, the user is informed which antenna is appropriate for receiving the digital broadcast signal among the external antenna and the internal antenna.

35. The method as claimed in claim 27, wherein, in the step of informing, the user is informed which antenna is appropriate for receiving the digital broadcast signal among the external antenna and the internal antenna.

36. The method as claimed in claim 30, wherein, in the step of informing, the user is informed which antenna is appropriate for receiving the digital broadcast signal among the external antenna and the internal antenna.

37. The method as claimed in claim 32, wherein, in the step of informing, the user is informed which antenna is appropriate for receiving the digital broadcast signal among the external antenna and the internal antenna.

38. The method as claimed in claim 24, wherein, in the step of informing, the user is informed through at least one of an LED, a vibrator, a ringer, a speaker and a display unit of the digital broadcast receiving terminal.

39. The method as claimed in claim 26, wherein, in the step of informing, the user is informed through at least one of an LED, a vibrator, a ringer, a speaker and a display unit of the digital broadcast receiving terminal.

40. The method as claimed in claim 29, wherein, in the step of informing, the user is informed through at least one of an LED, a vibrator, a ringer, a speaker and a display unit of the digital broadcast receiving terminal.

41. The method as claimed in claim 33, wherein, in the step of informing, the user is informed through at least one of an LED, a vibrator, a ringer, a speaker and a display unit of the digital broadcast receiving terminal.

42. The method as claimed in claim 23, wherein the step of determining the appropriate antenna comprises turning off the power of an RF unit connected to the antenna determined as being not appropriate to receive the digital broadcast signal among the internal antenna and the external antenna.

43. The method as claimed in claim 42, wherein the step of turning off the power comprises periodically turning on the power of the RF unit connected to the internal antenna according to the predetermined test period when the power supply to the RF unit to the internal antenna is interrupted.

44. The method as claimed in claim 23, further comprising periodically checking the signal-receiving condition to determine whether the digital broadcast signal received through the internal antenna is in the condition possible to be received according to the predetermined test period, in the case of receiving the digital broadcast signal through the external antenna.

45. The method as claimed in claim 44, wherein the step of periodically checking the signal-receiving condition comprises:

checking whether the predetermined test period expires;

determining whether the signal-receiving condition for the digital broadcast signal received through the internal antenna is good; and informing the user of the checking result when the signal-receiving condition for the digital broadcast signal according to the result of determining the signal-receiving condition of the signal received through the internal antenna.

46. The method as claimed in claim 45, wherein, in the step of determining the signal-receiving condition, if an intensity of the digital broadcast signal received through the internal antenna is less than a preset threshold of signal intensity, it is determined that the signal-receiving condition for the digital broadcast signal is not good, and if not, it is determined that the signal-receiving condition for the digital broadcast signal is good.

47. A method as claimed in claim 45, wherein, in the step of determining the signal-receiving condition, if a signal-to-noise ratio of the digital broadcast signal received through the internal antenna is less than a preset threshold of signal-to-noise ratio, it is determined that the signal-receiving condition for the digital broadcast signal is not good, and if not, it is determined that the signal-receiving condition for the digital broadcast signal is good.

48. The method as claimed in claim 45, wherein the step informing the user of checking result comprises:
  sensing the external antenna to check whether the digital broadcast signal is received through the external antenna; and
  informing the user of the sensing result if it is determined that the digital broadcast signal is received through the external antenna as the result of sensing.

49. The method as claimed in claim 45, further comprising determining the predetermined test period.

50. The method as claimed in claim 49, wherein the step of determining the predetermined test period comprises:
  determining whether there is a change in the signal-receiving condition for the digital broadcast signal received through the external antenna.

51. The method as claimed in claim 50, wherein, in the step of determining the change in the signal-receiving condition, the signal-receiving condition for the digital broadcast signal received through the external antenna is checked in a predetermined time interval.

52. A method as claimed in claim 50, wherein, in the step of determining the change in the signal-receiving condition, the signal-receiving condition for the digital broadcast signal received through the external antenna is checked in a predetermined time interval, and wherein if a signal-to-noise ratio of the received digital broadcast signal is increased, it is determined that the signal-receiving condition improves, if the signal-to-noise ratio of the received digital broadcast signal is reduced, it is determined that the signal-receiving condition worsens, and if not, it is determined that there is no change in the signal-receiving condition.

53. The method as claimed in claim 51, wherein, in the step of determining the change in the signal-receiving condition, the predetermined test period is increased if it is determined that the signal-receiving condition for the digital broadcast signal received through the external antenna is not changed or continuously worsens for the predetermined length of time as the restart of determining the change in the signal receiving condition.

54. The method as claimed in claim 52, wherein, in the step of determining the change in the signal-receiving condition, the predetermined test period is increased if it is determined that the signal-receiving condition for the digital broadcast signal received through the external antenna is not changed or continuously worsens for the predetermined length of time as the result of determining the change in the signal-receiving condition.

55. The method as claimed in claim 51, wherein, in the step of determining the change in the signal-receiving condition, the predetermined test period is decreased if it is determined that the signal-receiving condition for the digital broadcast signal received through the external antenna continuously improves for the predetermined length of time as the result of determining the change in the signal receiving condition.

56. The method as claimed in claim 52, wherein, in the step of determining the change in the signal-receiving condition, the predetermined test period is decreased if it is determined that the signal-receiving condition for the digital broadcast signal received through the external antenna continuously improves for the predetermined length of time as the result of determining the change in the signal-receiving condition.

* * * * *